(12) United States Patent
Massey et al.

(10) Patent No.: US 11,255,774 B2
(45) Date of Patent: Feb. 22, 2022

(54) GAS SENSOR

(71) Applicant: Eaton Intelligent Power Limited, Dublin (IE)

(72) Inventors: Alan Massey, Southampton (GB); Yogesh Shinde, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/769,593

(22) PCT Filed: Dec. 5, 2018

(86) PCT No.: PCT/EP2018/083666
§ 371 (c)(1),
(2) Date: Jun. 4, 2020

(87) PCT Pub. No.: WO2019/110670
PCT Pub. Date: Jun. 13, 2019

(65) Prior Publication Data
US 2021/0164889 A1    Jun. 3, 2021

(30) Foreign Application Priority Data

Dec. 5, 2017  (IN) .............................. 201711043654
Jul. 19, 2018  (GB) ...................................... 1811771

(51) Int. Cl.
*G01N 21/17*     (2006.01)
*G01N 21/05*     (2006.01)
(Continued)

(52) U.S. Cl.
CPC ......... *G01N 21/1702* (2013.01); *G01N 21/05* (2013.01); *G01N 29/024* (2013.01); *G01N 29/2418* (2013.01); *G01N 2021/1704* (2013.01)

(58) Field of Classification Search
CPC .. G01N 21/1702; G01N 21/05; G01N 29/024; G01N 29/2418; G01N 29/2437; G01N 2021/1704; G01N 2201/022
See application file for complete search history.

(56) References Cited

U.S. PATENT DOCUMENTS 3,683,694 A * 8/1972 Granberg ................ G01F 3/065
73/259
5,060,506 A   10/1991 Douglas
(Continued)

FOREIGN PATENT DOCUMENTS

| DE | 19935301 A1 | 2/2000 |
| EP | 0430859 A1 | 6/1991 |
| WO | WO 9926053 A1 | 5/1999 |

*Primary Examiner* — Suman K Nath
(74) *Attorney, Agent, or Firm* — Merchant & Gould P.C.

(57) ABSTRACT

A gas sensor includes: an outer housing having an outer housing gas inlet and an outer housing gas outlet for receiving a flow of gas; and an inner housing disposed within the outer housing such that a gas flow passage is defined through the gas sensor between the inner housing and the outer housing to allow gas to enter the outer housing gas inlet and exit the outer housing gas outlet. The inner housing is provided with an inner housing gas inlet and an inner housing gas outlet each in fluid communication with the gas flow passage. The inner housing gas inlet and inner housing gas outlet are positioned relative to the gas flow passage such that when gas flows through the gas flow passage there is a pressure gradient across the inner housing gas inlet and inner housing gas outlet which causes gas to pass through the inner housing.

20 Claims, 1 Drawing Sheet

(51) Int. Cl.
*G01N 29/024* (2006.01)
*G01N 29/24* (2006.01)

(56) References Cited

U.S. PATENT DOCUMENTS

| | | | |
|---|---|---|---|
| 5,415,041 A * | 5/1995 | Foran, Jr. | G01F 3/10 |
| | | | 73/261 |
| 5,475,222 A | 12/1995 | King | |
| 6,346,179 B1 | 2/2002 | Awano et al. | |
| 6,348,141 B1 | 2/2002 | Hamada et al. | |
| 7,294,839 B2 | 11/2007 | Rich et al. | |
| 9,719,812 B2 | 8/2017 | Barjatya et al. | |
| 2004/0144645 A1 | 7/2004 | Yamada et al. | |
| 2006/0289308 A1 | 12/2006 | Goray et al. | |

* cited by examiner

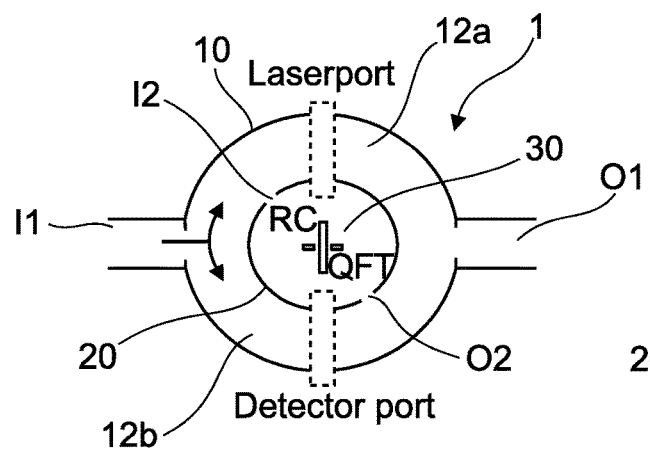
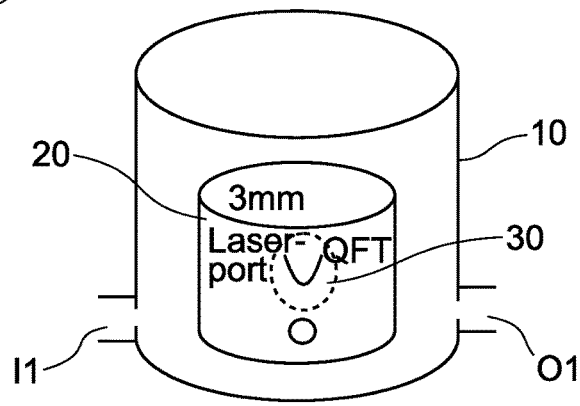
Fig. 1A
Fig. 1B
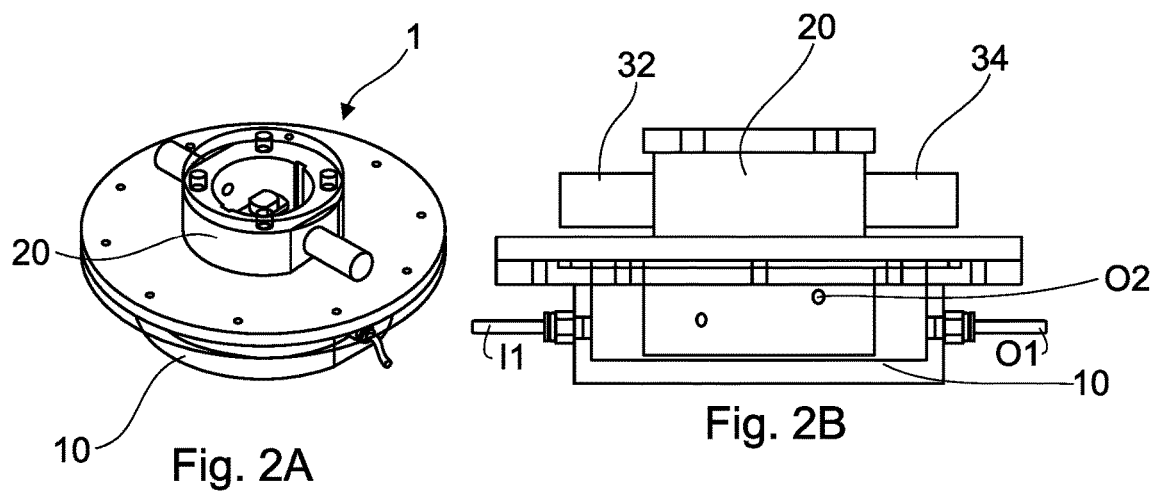
Fig. 2A
Fig. 2B
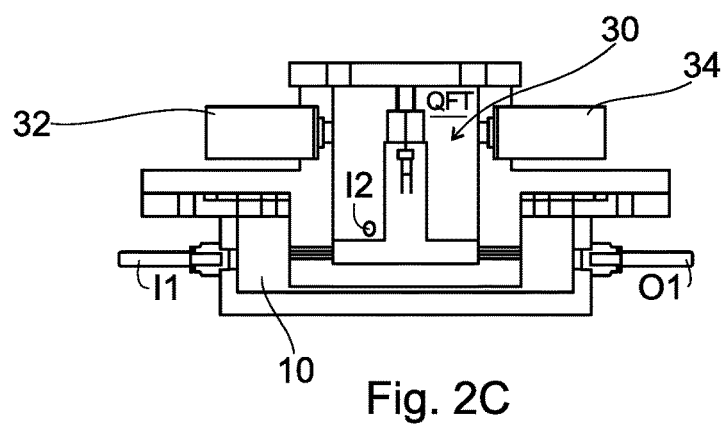
Fig. 2C

GAS SENSOR

CROSS-REFERENCE TO PRIOR APPLICATIONS

This application is a U.S. National Phase application under 35 U.S.C. § 371 of International Application No. PCT/EP2018/083666, filed on Dec. 5, 2018, and claims benefit to British Patent Application No. GB 1811771.3, filed on Jul. 19, 2018 and to Indian Patent Application No. IN 2017/11043654, filed on Dec. 5, 2017. The International Application was published in English on Jun. 13, 2019 as WO 2019/110670 under PCT Article 21(2).

FIELD

This invention relates to a gas sensor. Particularly, though not exclusively, the invention relates to an aircraft fuel system gas sensor.

BACKGROUND

Gas sensors are widely used in consumer, industrial, automotive and aerospace applications to monitor the concentration of various gases. Gas sensors may be optical gas sensors. A common technique for utilised in such optical gas sensors is "Quartz Enhanced Photo-acoustic Spectroscopy" (referred to herein as QEPAS). QEPAS operates by sensing the strength of the acoustic vibration generated in a gas due to exposure to a pulsed light source. The vibrations are sensed using a "Quartz Tuning Fork" (referred to herein as a QTF).

A known advantage of QEPAS measurement is that it is possible to use the same technology to detect different gases by merely altering the wavelength of the light source being used. However, when measuring flowing gases (particularly those with a variable flow rate), the QTF performance is sensitive to the gas flow rate which creates a cross-talk in gas concentration measurement. This may result in inaccurate or unreliable results from the sensor. Further, limiting the gas flow to avoid this cross-talk, will limit the update rate of QEPAS gas sensor.

Embodiments of the present invention are intended to address the problem of meeting the update rate for various inlet gas flow rates and mitigation of QTF cross-talk to the gas flow rate through an improved sensor design

SUMMARY

In an embodiment, the present invention provides a gas sensor, comprising: an outer housing having an outer housing gas inlet and an outer housing gas outlet configured to receive a flow of gas; and an inner housing disposed within the outer housing such that a gas flow passage is defined through the gas sensor between the inner housing and the outer housing to allow gas to enter the outer housing gas inlet and exit the outer housing gas outlet, wherein the inner housing is provided with an inner housing gas inlet and an inner housing gas outlet each in fluid communication with the gas flow passage, and wherein the inner housing gas inlet and inner housing gas outlet are positioned relative to the gas flow passage such that when gas flows through the gas flow passage there is a pressure gradient across the inner housing gas inlet and inner housing gas outlet which causes gas to pass through the inner housing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 1(A) and 1(B) is a schematic representation of a sensor layout in accordance with an embodiment; and FIGS. 2(A), 2(B) and 2(C) are an orthogonal view, side view (with part of the outer housing shown in semi-transparent outline) and a cross-sectional view of a sensor in accordance with an embodiment.

DETAILED DESCRIPTION

In an embodiment, the present invention provides a gas sensor (in particular an optical gas sensor, for example, a QEPAS gas sensor) comprising an outer housing having an outer housing gas inlet and an outer housing gas outlet for receiving a flow of gas, an inner housing disposed within the outer housing such that a gas flow passage is defined through the gas sensor between the inner and outer housing to allow gas to enter the outer housing inlet and exit the outer housing outlet; wherein the inner housing is provided with an inner housing gas inlet and an inner housing gas outlet each in fluid communication with the gas flow passage, and wherein the inner housing gas inlet and inner housing gas outlet are positioned relative to the gas flow passage such that when gas flows through the gas flow passage there is a pressure gradient across the inner housing gas inlet and inner housing gas outlet which causes gas to pass through the inner housing.

Embodiments of the invention are intended to reduce or eliminate the problem of sensor cross-talk to the gas flow rate. Embodiments of the invention are also intended to allow the sensor to achieve the desired update rate for gas concentration measurement in a wide range of inlet gas flow rates.

In particular, embodiments of the invention may provide an aircraft fuel system gas sensor.

The inner housing may contain a sensing element. For example, the inner housing may contain the QEPAS sensing element. The inner housing may contain a QTF and may be provided with a light source, such as a laser, and a light detector.

The gas flow passage may define branched passageways. For example, the gas flow passage may comprise branched passageways which extend from the outer housing gas inlet, pass around the inner housing and continue to the outer housing gas outlet.

In some embodiments, the inner housing may be cylindrical. The outer housing may be cylindrical and may be coaxial with the inner housing. Thus, the gas flow passage may be substantially annular and may surround the inner housing. The branched passageways may, therefore, be symmetrical half annular passageways which meet at or proximal to both the outer housing gas inlet and outer housing gas outlet. The outer housing gas inlet and outer gas housing outlet may be diametrically opposed.

The inner housing gas inlet and inner housing gas outlet may be provided on opposing sides of the inner housing, and may, for example, be diametrically opposed. The inner housing gas inlet may be in communication with one of the branched passageways and the inner housing gas outlet may be in communication with the other of the branched passageways. The dimensions and configuration of the inner housing gas inlet and inner housing gas inlet may be selected depending upon the required flow conditions to provide a desired flow within the inner housing.

The opposed inner housing gas inlet and inner housing gas outlet may be offset from the direction defined in a straight line between the outer housing gas inlet and outer gas outlet. The angle between the directions of the inner housing gas inlet and outlet may be non-perpendicular such that a pressure difference is provided across the inner housing. The inner housing may shield the sensor from direct flow of gas entering the gas flow passage.

The inner and outer housings may be relatively rotationally movable. Thus, the offset angle between the inner housing and outer housing may be adjustable. Adjusting the offset angle may alter the pressure gradient across the inner housing for any given flow rate through the gas flow passage (i.e. the flow rate through the sensor). By selecting an appropriate offset angle the working range of flow rates may be tuned for a particular application.

According to a further aspect of the invention, there is provided an aircraft fuel system comprising at least one gas sensor in accordance with an embodiment of the invention.

According to a further aspect of the invention, there is provided an aircraft comprising at a fuel system having at least one gas sensor in accordance with an embodiment of the invention.

FIGS. 1 & 2 show a sensor 1 in accordance it's an embodiment having a cylinder in cylinder design in accordance with an embodiment. The sensor comprises an outer housing 10 and inner housing 20. The outer housing is provided with a gas inlet (I1) and outlet (O1). The inner housing 20 contains a sensing element 30 (for example a QTF) inside and may be provided with a laser source 32 and light detector 34.

The arrangement of the housings 10 and 20 divides the inlet gas flow in two paths 12a 12b flowing around the internal cylinder 20. The inlet to outlet pressure gradient is formed in both these paths of the gas, this pressure gradient is used for controlling the gas flowing inside the internal cylinder 20. Internal Cylinder 20 has an inlet (I2) and outlet (O2) for gas and its position with respect to the inlet (I1) and outlet (O1) of the external cylinder 10. The relative position of the internal and external ports can be changed by simply rotating the internal cylinder 20 relative to the external cylinder 10. The gas flow inside the internal cylinder can be controlled by adjusting its angular position. the I2 & O2 see differential pressure across it, depending on the angle between external cylinder inlet (I1) and internal cylinder inlet (I2), hence it controls the gas flow inside the internal cylinder. The gas flow inside the internal cylinder is also a function of the size of inlets and outlets.

The dimensions of cylinders are tuned such that the sensing element does not see the direct gas flow but the gas at sensing element is updated due to the diffusion process. Due to this the update time of the sensor remains fairly stable over wide range of the inlet gas flow rates. The working range of input flow rates can be tuned using the angular position of the internal cylinder.

Advantageously, embodiments of the invention concept do not require small orifices which may be blocked because of dust/or condescension of the water vapor in extreme environmental conditions. Multiple or few such a cylinder in cylinder structures may be used for achieving the same effect.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical gas sensor, comprising:
   an outer housing having an outer housing gas inlet and an outer housing gas outlet configured to receive a flow of gas; and
   an inner housing disposed within the outer housing such that a gas flow passage is defined through the gas sensor between the inner housing and the outer housing to allow gas to enter the outer housing gas inlet and exit the outer housing gas outlet, wherein the inner housing is provided with an inner housing gas inlet and an inner housing gas outlet each in fluid communication with the gas flow passage, and
   wherein the inner housing gas inlet and inner housing gas outlet are positioned relative to the gas flow passage such that when gas flows through the gas flow passage there is a pressure gradient across the inner housing gas inlet and inner housing gas outlet which causes gas to pass through the inner housing; and
   the inner housing and the outer housing being relatively rotationally moveable to change positions of the inner housing gas inlet and the inner housing gas outlet relative to the outer housing gas inlet and the outer housing gas outlet, thereby adjusting an angular position of the inner housing, depending on an angle between the outer housing gas inlet and the inner housing gas inlet, to control the gas flow inside the inner housing.

2. The optical gas sensor of claim 1, wherein the inner housing comprises a sensing element.

3. The optical gas sensor of claim 2, wherein the sensing element comprises a quartz enhanced photo-acoustic spectroscopy (QEPAS) sensing element.

4. The optical gas sensor of claim 2, wherein dimensions of the inner and outer housing are configured so that the sensing element does not directly see flow along the gas flow passage.

5. The optical gas sensor of claim 1, wherein the gas flow passage comprises a plurality of branched gas flow passageways.

6. The optical gas sensor of claim 5, wherein the plurality of branched gas flow passageways extend from the outer housing gas inlet, around the inner housing, and to the outer housing gas outlet.

7. The optical gas sensor of claim 5, wherein the inner housing gas inlet is in communication with one of the plurality of branched gas flow passageways, and the inner housing gas outlet is in communication with another of the plurality of branched gas flow passageways.

8. The optical gas sensor of claim 5, wherein the branched gas flow passageways include a first path and a second path flowing around the inner housing.

9. The optical gas sensor of claim 8, wherein the first and second paths are symmetrical half annular passageways which meet at or proximal to both the outer housing gas inlet and outer housing gas outlet.

10. The optical gas sensor of claim 1, wherein the inner housing is cylindrical.

11. The optical gas sensor of claim 10, wherein the outer housing is cylindrical and coaxial with the inner housing.

12. The optical gas sensor of claim 1, wherein the inner housing gas inlet and the inner housing gas outlet are disposed on opposing sides of the inner housing.

13. The optical gas sensor of claim 12, wherein the inner housing gas inlet and inner housing gas outlet are offset from a straight line between the outer housing gas inlet and outer housing gas outlet.

14. The optical gas sensor of claim 13, wherein the inner housing gas inlet and inner housing gas outlet are offset from the straight line at a non-perpendicular angle.

15. An aircraft fuel system, comprising: at least one gas sensor in accordance with claim 1.

16. An aircraft comprising: a fuel system including at least one gas sensor in accordance with claim 1.

17. The optical gas sensor of claim 1, wherein the outer housing gas inlet and outer housing gas outlet are diametrically opposed.

18. The optical gas sensor of claim 1, wherein a light port is disposed at the inner housing.

19. The optical gas sensor of claim 18, wherein the light port includes a laser port.

20. The optical gas sensor of claim 19, wherein a light detector port aligns with the laser port.

* * * * *